(12) United States Patent
Moon et al.

(10) Patent No.: US 12,443,141 B2
(45) Date of Patent: Oct. 14, 2025

(54) HOLOGRAPHIC DISPLAY APPARATUS INCLUDING FREEFORM CURVED SURFACE AND OPERATING METHOD THEREOF

(71) Applicant: SAMSUNG ELECTRONICS CO., LTD., Suwon-si (KR)

(72) Inventors: Seokil Moon, Suwon-si (KR); Changkun Lee, Seoul (KR); Geeyoung Sung, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1015 days.

(21) Appl. No.: 17/518,804

(22) Filed: Nov. 4, 2021

(65) Prior Publication Data

US 2022/0342366 A1 Oct. 27, 2022

(30) Foreign Application Priority Data

Apr. 23, 2021 (KR) .......................... 10-2021-0053105

(51) Int. Cl.
*G03H 1/08* (2006.01)
*G02B 27/01* (2006.01)
*G03H 1/22* (2006.01)

(52) U.S. Cl.
CPC ............ *G03H 1/08* (2013.01); *G02B 27/0172* (2013.01); *G03H 1/2294* (2013.01);
(Continued)

(58) Field of Classification Search
CPC .... G03H 2225/32; G03H 1/08; G03H 1/0808; G03H 1/0892; G03H 1/2205;
(Continued)

(56) References Cited

U.S. PATENT DOCUMENTS

2008/0297865 A1\* 12/2008 Hara .................. G11B 7/00781
359/12
2009/0130449 A1 5/2009 El-Siblani
(Continued)

FOREIGN PATENT DOCUMENTS

KR 10-2016-0091402 A 8/2016
WO WO-2018100394 A1 \* 6/2018 ............... G02B 5/32

OTHER PUBLICATIONS

"Phase Conjugation and Image Correction Wavefront Coding" by E.N. Leith doi.org/10.1016/B0-12-369395-0/00780-6 (Year: 2005).\*
(Continued)

*Primary Examiner* — Jennifer D. Carruth
(74) *Attorney, Agent, or Firm* — Sughrue Mion, PLLC

(57) ABSTRACT

A holographic display apparatus including a freeform curved surface and an operating method of the holographic display apparatus are provided. The holographic display apparatus includes: an image generator configured to generate a hologram image by modulating light; an optical system including a freeform curved surface for forming the hologram image generated by the image generator in a predetermined depth; and a processor configured to generate a computer-generated hologram (CGH) based on three-dimensional image information by using a phase map including information about an optical aberration with respect to the freeform curved surface and to control the image generator to modulate the light based on the CGH.

20 Claims, 15 Drawing Sheets

(52) U.S. Cl.
CPC ............... *G02B 2027/0174* (2013.01); *G02B 2027/0178* (2013.01); *G03H 2210/30* (2013.01); *G03H 2225/32* (2013.01)

(58) Field of Classification Search
CPC ......... G03H 1/2294; G03H 2001/2221; G03H 2001/2247; G03H 2001/2284; G03H 2210/30; G03H 2226/02; G02B 27/0172; G02B 2027/0109; G02B 2027/011; G02B 2027/0174
USPC ...................................................... 359/9, 11
See application file for complete search history.

(56) References Cited

U.S. PATENT DOCUMENTS

| | | |
|---|---|---|
| 2010/0033781 A1* | 2/2010 | Leister ................. G03H 1/0808 359/9 |
| 2016/0109706 A1 | 4/2016 | Schowengerdt et al. |
| 2018/0081322 A1* | 3/2018 | Robbins ............... G03H 1/2294 |
| 2019/0072897 A1 | 3/2019 | Jepsen et al. |
| 2019/0278548 A1 | 9/2019 | Sun et al. |
| 2020/0132888 A1 | 4/2020 | Perreault et al. |
| 2021/0335049 A1 | 10/2021 | Miller et al. |
| 2022/0082831 A1* | 3/2022 | Seo ...................... H04N 13/337 |
| 2022/0300073 A1* | 9/2022 | Reshidko ............... G06V 40/19 |

OTHER PUBLICATIONS

Phase Difference and Phase Shift by "ElectronicsTutorials" (Year: 2014).*

* cited by examiner

After compensation

HOLOGRAPHIC DISPLAY APPARATUS INCLUDING FREEFORM CURVED SURFACE AND OPERATING METHOD THEREOF

CROSS-REFERENCE TO RELATED APPLICATION

This application is based on and claims priority under 35 U.S.C. § 119 to Korean Patent Applications No. 10-2021-0053105, filed on Apr. 23, 2021, in the Korean Intellectual Property Office, the disclosure of which is incorporated by reference herein in its entirety.

BACKGROUND

1. Field

The disclosure relates to a holographic display apparatus including a freeform curved surface and an operating method of the holographic display apparatus.

2. Description of Related Art

A head-mounted display (HMD) providing virtual reality (VR) has been recently commercialized and widely used in the entertainment industry. Also, the HMD has been developed into a form to be applied to medical, educational, and industrial fields.

An augmented reality (AR) display, which is an advanced form of a VR display, is an image apparatus that combines a real world with VR to derive an interaction between the real world and the VR. The interaction between the real world and the VR is based on a function of providing information about a real situation in real time, and by overlapping a virtual object or information on a real world environment, an effect of the real world may further be increased.

SUMMARY

Provided are a holographic display apparatus having a freeform curved surface and an operating method of the holographic display apparatus.

Provided are a holographic display apparatus capable of compensating for distortion due to a freeform curved surface and an operating method of the holographic display apparatus.

Additional aspects will be set forth in part in the description which follows and, in part, will be apparent from the description, or may be learned by practice of embodiments of the disclosure.

In accordance with an aspect of the disclosure, a holographic display apparatus includes an image generator configured to generate a hologram image by modulating light; an optical system including a freeform curved surface configured to form the hologram image generated by the image generator at a predetermined depth; and a processor configured to: generate a computer-generated hologram (CGH) based on three-dimensional image information using a phase map, the phase map including information about an optical aberration due to the freeform curved surface; and control the image generator to modulate the light based on the CGH.

The phase map may include phase information of the light based on a light path on which the light modulated by the image generator is transmitted to a viewer by the freeform curved surface.

The phase information of the light may include a difference between a phase of the light at a time when the light is modulated by the image generator and a phase of the light at a time when the light reaches the viewer.

The phase information may be inversely proportional to a wavelength of the light modulated by the image generator.

The phase information may be proportional to a refractive index of a medium on the light path on which the light modulated by the image generator is transmitted to the viewer through the freeform curved surface.

The phase information may be proportional to a length of the light path on which the light modulated by the image generator is transmitted to the viewer through the freeform curved surface.

The processor may be further configured to perform phase modulation on the CGH using the phase map.

The processor may be further configured to modulate the CGH using a conjugate value of the phase map.

The processor may be further configured to apply, to the three-dimensional image information, a distortion compensation algorithm configured to compensate for image shape distortion due to the freeform curved surface.

The distortion compensation algorithm may include an inversely transformed algorithm of a mapping algorithm, the mapping algorithm being configured to map location information of pixels included in the three-dimensional image information with location information of pixels of a virtual image corresponding to the three-dimensional image information.

The processor may be further configured to apply the distortion compensation algorithm to an entirety of the location information of the pixels included in the three-dimensional image information.

The processor may be further configured to apply the distortion compensation algorithm to the location information of one or more pixels from among the pixels included in the three-dimensional image information and linearly interpolate the location information of the other pixels from among the pixels included in the three-dimensional image information.

The optical system may include a combiner configured to converge the hologram image and external light to one point, the external light corresponding to an external environment, and the freeform curved surface may be integral with the combiner.

The combiner may include a waveguide configured to transmit the hologram image, wherein the freeform curved surface is arranged on a surface of the waveguide.

The combiner may further include a transflective layer arranged on the freeform curved surface.

The holographic display apparatus may include a virtual reality apparatus or an augmented reality apparatus.

In accordance with an aspect of the disclosure, an operating method of a holographic display apparatus including a freeform curved surface includes generating a computer-generated hologram (CGH) based on three-dimensional image information using a phase map, the phase map including information about an optical aberration due to the freeform curved surface; generating a hologram image by modulating light based on the CGH; and forming the hologram image at a predetermined depth by the freeform curved surface.

The phase map may include phase information of the light based on a light path on which the light modulated as the hologram image is transmitted to a viewer by the freeform curved surface.

The phase information of the light may include a difference between a phase of the light at a time when the light is modulated as the hologram image and a phase of the light at a time when the light reaches the viewer.

The generating of the CGH may include modulating the CGH using a conjugate value of the phase map.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
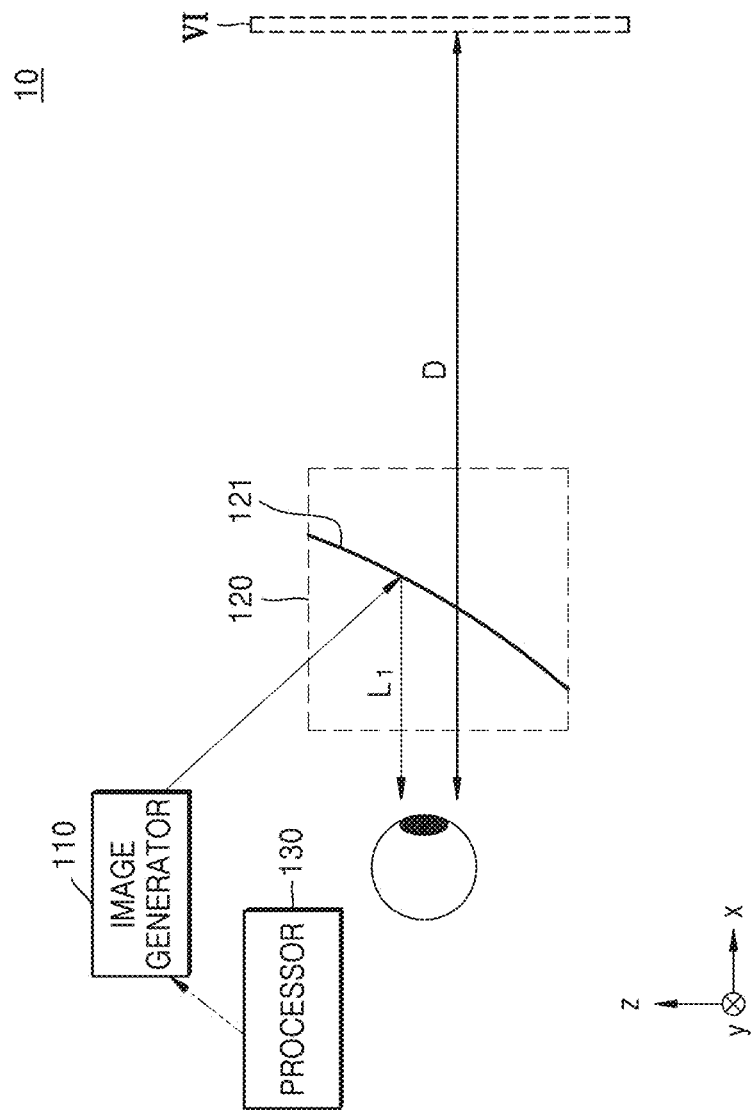
FIG. 1 is a schematic diagram of components of a holographic display apparatus applied to virtual reality (VR), according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a display apparatus including a freeform curved surface will be described in detail by referring to the accompanying drawings. In the drawings, the same reference numerals denote the same elements and sizes of elements may be exaggerated for clarity and convenience of explanation. Also, embodiments described hereinafter are only examples, and various modifications may be made based on the embodiments.

Hereinafter, it will be understood that when an element is referred to as being "on" or "above" another element, the element can be directly over or under the other element and directly on the left or on the right of the other element, or intervening elements may also be present therebetween. As used herein, the singular terms "a" and "an" are intended to include the plural forms as well, unless the context clearly indicates otherwise. It will be further understood that when a part "includes" or "comprises" an element, unless otherwise defined, the part may further include other elements, not excluding the other elements.

The term "the" and other equivalent determiners may correspond to a singular referent or a plural referent. Operations included in a method may be performed in an appropriate order, unless the operations included in the method are described to be performed in an apparent order, or unless the operations included in the method are described to be performed otherwise.

Also, the terms such as " . . . unit," "module," or the like used in the specification indicate a unit, which processes at least one function or motion, and the unit may be implemented by hardware or software, or by a combination of hardware and software.

The connecting lines, or connectors shown in the various figures presented are intended to represent example functional relationships and/or physical or logical couplings between the various elements. It should be noted that many alternative or additional functional relationships, physical connections or logical connections may be present in a practical device.

Operations included in a method may be performed in an appropriate order, unless the operations included in the method are described to be performed in an apparent order, or unless the operations included in the method are described to be performed otherwise. The operations are not necessarily limited to the described order.

The use of all examples and example terms are merely for describing the disclosure in detail and the disclosure is not limited to the examples and the example terms.

Figure 2:
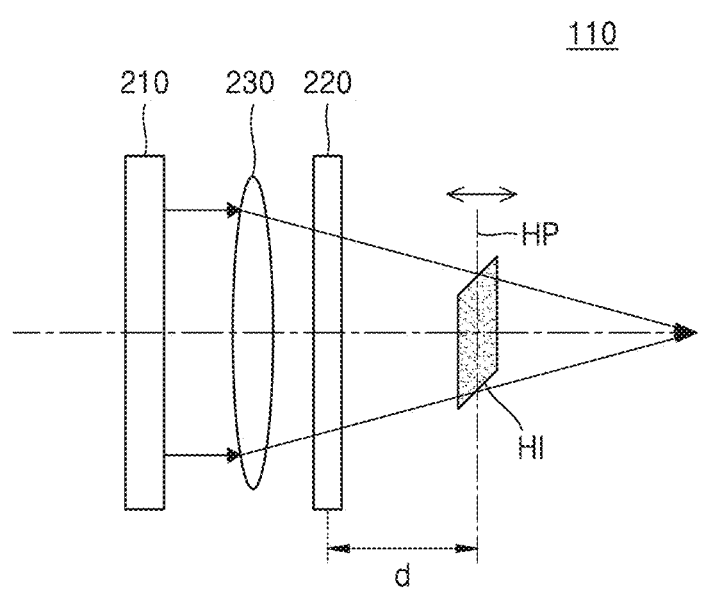
FIG. 2 is a schematic diagram of components of an image generator of FIG. 1.

FIG. 1 is a schematic diagram of components of a holographic display apparatus 10 applied to virtual reality (VR), according to an embodiment, and FIG. 2 is a schematic diagram of components of an image generator 110 of FIG. 1. Referring to FIG. 1, the holographic display apparatus 10 according to an embodiment may include the image generator 110 configured to generate a hologram image, an optical system 120 including a freeform curved surface 121 for forming the hologram image at a predetermined depth D, and a processor 130 configured to generate a computer-generated hologram (CGH) based on three-dimensional image information and provide the CGH to the image generator 110.

The image generator 110 may generate the hologram image by modulating light. As illustrated in FIG. 2, the image generator 110 may include a light source 210 configured to provide coherent light, a spatial light modulator 220 configured to generate the hologram image by diffracting the light from the light source 210, and a focal optical system 230 configured to form the hologram image on a predetermined space.

The light source 210 may provide coherent light. The light source 210 may include a laser diode. However, when light has a predetermined degree of spatial coherence, the light may become coherent by being diffracted and modulated by the spatial light modulator 220, and thus, other light sources emitting light having a predetermined degree of spatial coherence may also be used.

Other elements may be further arranged, including for example, a waveguide configured to transmit light incident from the light source 210 and to output light of a different dimension, and a beam expander located between the light source 210 and the waveguide and configured to expand a dimension of light.

The spatial light modulator 220 may generate the hologram image by diffracting incident light. A hologram method uses a principle that when a reference wave is irradiated to a hologram recording an interference fringe between an object wave and the reference wave, the object wave is reproduced. Recently, to form this interference fringe, a CGH has been used.

The spatial light modulator 220 may include, for example, a liquid crystal-on-silicon (LCoS) device, a liquid crystal display (LCD), an organic light-emitting diode (OLED), a digital micro-mirror device (DMD), and next-generation display devices, such as a micro-light-emitting diode (micro-LED), a quantum dot (QD) LED, etc.

The focal optical system 230 may be configured to display the hologram image according to depth information included in the hologram image. That is, the focal optical system 230 may be configured to represent multiple depths, and through the multiple depth representation, visual fatigue may be reduced. The focal optical system 230 may be configured to display the hologram image generated by the spatial light modulator 220 on a hologram plane HP and may vary a location of the hologram plane HP.

The focal optical system 230 may include one or more lenses. The one or more lenses may be configured to have varied curvatures or may be configured to move in an optical axis direction, and thus, the location of the hologram plane HP, on which the hologram image is displayed, may be varied.

The processor 130 may generate the CGH based on the three-dimensional image information. Also, the processor 130 may compensate for distortion of the hologram image by modulating a phase of the CGH.

According to a method of generating the CGH, the CGH may be divided into a point cloud type, a polygonal type, a depth map (or a layer-based) type, etc. However, the method of generating the CGH is well known, and thus, its detailed description is omitted.

The processor 130 may correspond to processors included in various types of computing devices, such as a personal computer (PC), a server device, a television (TV), a mobile device (a smart phone, a tablet device, etc.), an embedded device, an autonomous vehicle, a wearable device, an augmented reality (AR) device, an Internet of Things (IoT) device, etc. For example, the processor 130 may correspond to processors, such as a central processing unit (CPU), a graphics processing unit (GPU), an application processor (AP), a neural processing unit (NPU), etc., but is not limited thereto.

Generally, when the CGH is input to the spatial light modulator 220, the spatial light modulator 220 may modulate the incident light according to the CGH and generate the hologram image. To generate the CGH, a hologram value with respect to each location of the hologram plane HP may be generated. To this end, a fast Fourier transform (FFT) may be generated for each layer to generate an appropriate focal point for all depth planes on a space. Because the CGH has to be generated with respect to all layers, the amount of generation is large.

Thus, to simplify processing of the three-dimensional image information, the processor 130 may determine a representative depth d from the three-dimensional image information. The processor 130 may determine the representative depth d by analyzing color information and depth information included in the three-dimensional image information. The representative depth d may be connected with a depth at which the freeform curved surface to be described below forms a virtual image.

The image information may include the color information and the depth information for each of images in a frame unit. In other words, the image information may include a single depth information for each frame. When the depth information included in the image information is depth information in the frame unit, the processor 130 may generate the CGH based on the depth information.

When the depth information is not the depth information in the frame unit, for example, when the depth information is provided in units of a sub-image or a pixel, the processor 130 may determine a representative depth d of the frame unit and may generate the CGH based on the representative depth d.

The processor 130 may determine the representative depth d with respect to each image in the frame unit by using the color information and/or the depth information included in the image information.

For example, the processor 130 may extract a color map from the image information and may perform content analysis and/or saliency information analysis on the color map to determine the representative depth d. The saliency information analysis may be performed to determine an area having a high probability of being viewed by a viewer, that is, an area having a high visual concentration degree. In order to determine the area having the high visual concentration degree, brightness, a color, an outline, an object size, etc. may be taken into account. For example, an area having a large difference in brightness or color from an ambient environment, having a distinct outline, or having a large-sized object may be the area having the high visual concentration degree. A depth value corresponding to this area may be determined as the representative depth d. Alternatively, according to content of an image, a location having a high visual concentration degree may be determined.

In addition, the processor 130 may determine the representative depth d by taking into account a zone of comfort from the depth map and may quantize depth information included in the depth map to determine the representative depth d based on the quantized depth information.

The processor 130 may generate the CGH according to the determined representative depth d.

That is, the processor 130 may obtain one CGH image layer. The processor 130 may generate the CGH having the representative depth d for each frame of the three-dimensional image information. Thus, the spatial light modulator 220 may generate the hologram image according to the CGH, and the focal optical system 230 may display the generated hologram image on the hologram plane HP located at the representative depth d. It is described that the focal optical system 230 may adjust the focal point to form the hologram plane HP at the representative depth d. However, the disclosure is not limited thereto. By changing a location of the spatial light modulator 220, the hologram plane HP corresponding to the representative depth d may be adjusted.

The freeform curved surface 121 may form a virtual image corresponding to the hologram image at a predetermined depth D corresponding to the representative depth d, that is, the predetermined depth D from an eye of a user. In detail, the hologram image generated by the image generator 110 may be reflected from the freeform curved surface 121 and transmitted to the eye of the user. The viewer may recognize that the hologram image is formed at the predetermined depth D based on a length of a light path between the hologram image generated by the image generator 110 and the freeform curved surface 121. Since the viewer may recognize a hologram image located in a different location from the image generated by the image generator 110, the image recognized by the viewer may be referred to as a virtual image VI.

The freeform curved surface 121 refers to a curved surface that is optimally designed to focus off-axially incident light to one focal point or to wholly form an obliquely incident image with respect to an optical axis. In general, a mirror surface having a curvature may soundly operate with respect to light that is incident based on an optical axis, but may have a significant optical aberration with respect to obliquely incident light.

When a display apparatus applied to VR or AR is developed, in order to relatively more freely arrange a location of the image generator 110 while reducing a size of the overall system, an optical system may have to be able to form an obliquely incident image as a sound virtual image. In this case, instead of a general mirror surface, the freeform curved surface 121, which is optimally designed with respect to the image generator 110 in a fixed location, may be used as illustrated in FIG. 1 to form a high quality virtual image.

Figure 3:
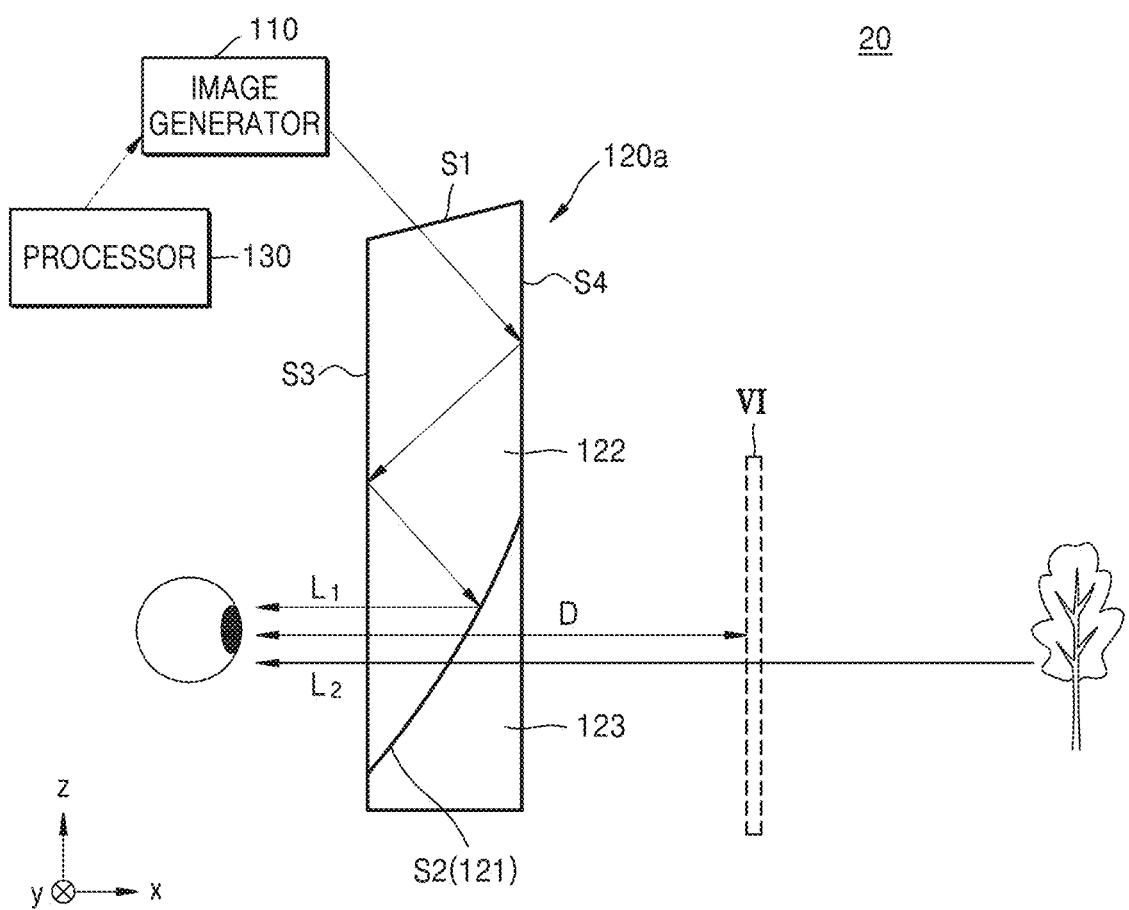
FIG. 3 is a schematic diagram of components of a holographic display apparatus applied to augmented reality (AR), according to an embodiment.

FIG. 3 is a schematic diagram of components of a holographic display apparatus 20 applied to AR, according to an embodiment. To compare FIGS. 1 and 3, the holographic display apparatus 20 of FIG. 3 may include the image generator 110 configured to generate a hologram image, a combiner 120a that is an optical system configured to mix a virtual image and light containing an external scenery and provide the mixed image to a viewer, and a processor 130 configured to generate a CGH based on three-dimensional image information and provide the CGH to the image generator 110.

The combiner 120a may transmit not only light $L_1$ containing an image generated by the image generator 110, but also light $L_2$ containing an external scenery of a front side of a viewer, to an eye of the viewer. For example, the combiner 120a may reflect the light $L_1$ containing the image toward the eye of the viewer and may transmit the $L_2$ containing the external scenery toward the eye of the viewer.

The external light $L_2$ may contain a real scenery of the front side of the viewer, rather than an image generated by the image generator 110. Thus, the viewer may simultaneously recognize the image artificially generated by the image generator 110 and the real front view. Thus, the holographic display apparatus 20 may function as a see-through type display.

The combiner 120a may include a waveguide 122 configured to transmit the image generated by the image generator 110. The waveguide 122 may include a plurality of surfaces, and at least one of the plurality of surfaces may include the freeform curved surface 121.

As illustrated in FIG. 3, the waveguide 122 may include a first surface S1 and a second surface S2 that is the freeform curved surface 121, which are arranged to face each other, and a third surface S3 and a fourth surface S4 arranged to face each other between the first and second surfaces S1 and S2. It is illustrated that the second surface S2 is the freeform curved surface 121. However, the disclosure is not limited thereto. The first surface S1 may also be the freeform curved surface. The third surface S3 and the fourth surface S4 may be arranged to be parallel to each other so as not to have refractive power.

The combiner 120a may further include a light transmissive plate 123 contacting the waveguide 122. The light transmissive plate 123 may include a curved surface having a complementary shape with respect to that of the freeform curved surface 121, and may share the third surface S3 and the fourth surface S4 of the waveguide 122. The light $L_2$ containing the external scenery may be incident into the fourth surface S4, and then, may sequentially pass through the freeform curved surface 121 and the third surface S3 so as to be incident to the eye of the viewer.

A transflective layer may be arranged on the freeform curved surface 121 to reflect the light $L_1$ containing the image and transmit the light $L_2$ containing the external scenery. The transflective layer may simply reflect a portion of incident light and transmit a remaining portion of the incident light. In this case, a portion of the light $L_1$ containing the image may be reflected by the transflective layer of the freeform curved surface 121 to proceed toward the eye of the viewer, and a portion of the light $L_2$ containing the external scenery may be transmitted by the transflective layer of the freeform curved surface 121 to proceed toward the eye of the viewer.

When the light $L_1$ containing the image generated by the image generator 110 has polarization characteristics, the transflective layer may be configured to reflect light having predetermined polarization properties and transmit light having other polarization properties. For example, when the light $L_1$ containing the virtual image has a first polarization property, the transflective layer may reflect light having the first polarization property and may transmit light having a second polarization property perpendicular to the first polarization property.

In FIG. 3, it is described that the transflective layer is arranged on the freeform curved surface 121. However, the disclosure is not limited thereto. The transflective layer and the freeform curved surface 121 may also be separately arranged on the waveguide 122.

The freeform curved surface 121 described above may be optimally designed with respect to the location of the image generator 110. For example, a profile of the freeform curved surface 121 may be designed through an optimization process for satisfying various conditions, such as a viewing angle of a virtual image recognized by a viewer, a thickness of the optical system 120 including the freeform curved surface 121, a size of an eye box, a location of the image generator 110, etc.

Just when an optical condition applied to design the freeform curved surface 121 and an optical condition applied to use the freeform curved surface 121 are slightly different from each other, the viewer may recognize a virtual image having a deteriorated quality, that is, a virtual image having a large optical aberration or distortion. Alternatively, when the freeform curved surface 121 is not optimally designed, it may be difficult to realize a high quality virtual image. The freeform curved surface 121 is designed with respect to the optical system 120 that is off-axial, and thus, distortion occurring due to the freeform curved surface 121 may become much more irregular and significant than pincushion distortion occurring when a general lens is used to view a virtual image. Thus, there is a limitation to the application of an algorithm for compensating for distortion of an image, which is generally used in a previous display apparatus.

Figure 4:
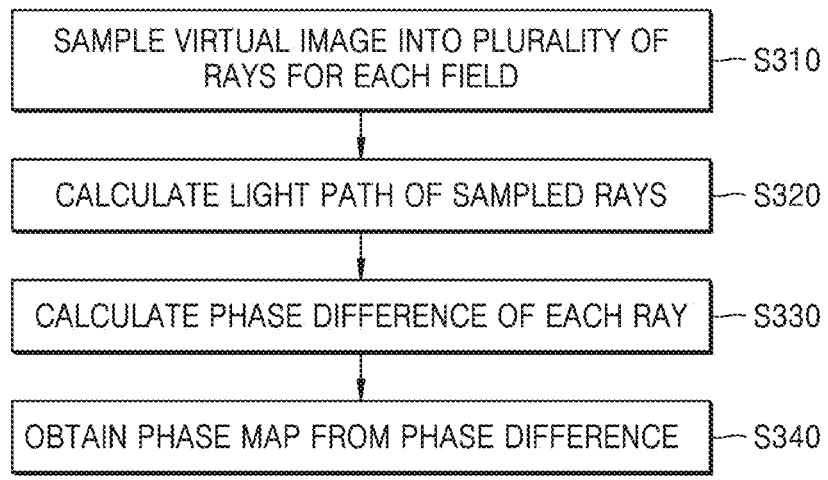
FIG. 4 is a flowchart of a method of calculating distortion of a virtual image according to an optical aberration of a freeform curved surface, according to an embodiment.
Figure 5:
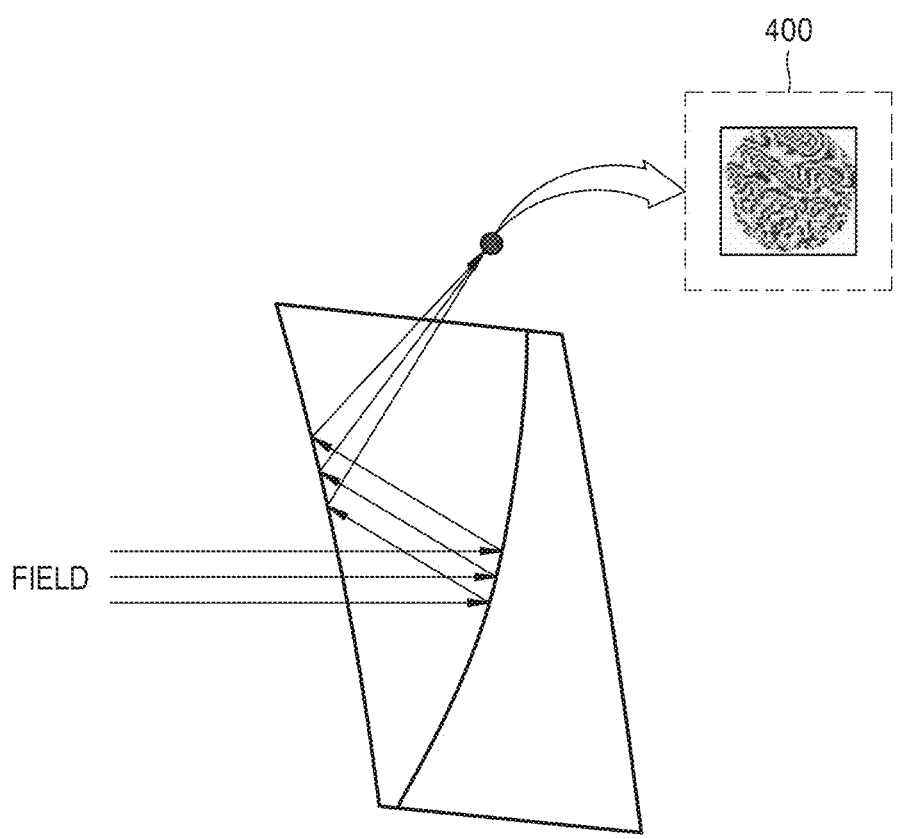
FIG. 5 is a reference diagram for describing a portion of a phase map using a ray, according to an embodiment.

FIG. 4 is a flowchart of a method of calculating distortion of a virtual image according to an optical aberration of the freeform curved surface 121, according to an embodiment, and FIG. 5 is a reference diagram for describing a method of obtaining a phase map by using a ray, according to an embodiment. As illustrated in FIG. 4, the processor 130 may sample a virtual image delivered to a viewer into a plurality of rays for each field (S310). An image sensor, for example, a charge-coupled device (CCD) sensor, may be arranged on a space on which an eye of the viewer is located, and the processor 130 may sample the virtual image into the plurality of rays for each field by using a result received from the sensor.

The processor 130 may calculate a light path of each of the plurality of rays backwardly propagated to the image generator 110 through the freeform curved surface 121 (S320). The light path may be calculated by using various optical software, such as Zemax, CodeV, Light tools, etc.

The processor 130 may calculate a phase difference of each ray on the light path as shown in the following Equation 1 (S330).

$$\phi_k = \frac{2\pi}{\lambda} \cdot n \cdot d_k. \quad \text{[Equation 1]}$$

Here, $\phi_k$ indicates a phase difference of a $k^{th}$ ray of a field of a predetermined direction, $\lambda$ indicates a wavelength of the ray, n indicates a refractive index, and $d_k$ indicates a length of the light path of the $k^{th}$ ray. In detail, a phase difference of a ray denotes a difference between a phase of light at a time when the light is modulated by the image generator 110 and a phase of light at a time when the light is transmitted to the viewer (e.g., at a time when the light reaches the viewer), the refractive index denotes valid refractive indices of all mediums arranged on the light path where the rays modulated by the image generator 110 are transmitted to the viewer through the freeform curved surface 121, and the length of the light path denotes lengths of all light paths, on which the rays modulated by the image generator 110, are transmitted to the viewer through the freeform curved surface 121.

As illustrated in Equation 1, the phase difference of each ray may be inversely proportional to the wavelength of light, may be proportional to the refractive index of the medium on the light path, and may be proportional to the length of the light path.

The processor 130 may obtain a phase map based on the phase difference (S340). In detail, the processor 130 may obtain phase information (that is, wavefront information) of a corresponding field by sequentially performing interpolation by applying a point spread function to the phase differences of the rays included in each field. Also, the processor 130 may obtain the phase map by summing wavefront information of the fields with respect to the entire virtual image.

FIG. 5 is a diagram of a portion of a phase map obtained from a ray of a predetermined field, according to an embodiment. When the freeform curved surface 121 is ideally designed, a field in a predetermined direction may be converged to a phase value of a predetermined pixel. However, when the freeform curved surface 121 is not optimally designed, or due to an error in the arrangement between the optical system 120 and the image generator 110 of the holographic display apparatus 10, there may be phase information 400 as illustrated in FIG. 5. The phase information 400 described above may be a result of applying the point spread function to the phase differences of the rays included in a predetermined field.

The phase map may be obtained when the holographic display apparatus 10 is manufactured and may be pre-stored in a memory of the holographic display apparatus 10. However, the phase map is not limited thereto. After arranging a sensor (for example, camera) corresponding to an eye of the viewer at a location at which the eye of the viewer is to be positioned, in the holographic display apparatus 10 which is manufactured, the processor 130 of the holographic display apparatus 10 may obtain the phase map. Alternatively, the processor 130 of the holographic display apparatus 10 may update a pre-stored phase map.

The image generator 110 may generate the hologram image by adjusting an amplitude and a phase of light, and thus, the holographic display apparatus 10 according to an embodiment may provide a virtual image in which an optical aberration generated due to the freeform curved surface 121 is compensated for by using the phase map.

Figure 6:
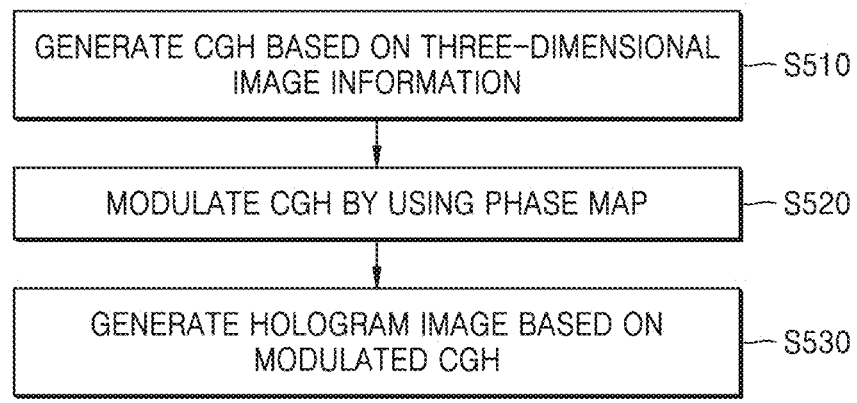
FIG. 6 is a flowchart for describing a method of generating a hologram image by using a phase map including information about an optical aberration of a freeform curved surface, according to an embodiment.

FIG. 6 is a flowchart for describing a method of generating a hologram image by using a phase map including information about an optical aberration of a freeform curved surface, according to an embodiment.

The processor 130 may generate a CGH based on three-dimensional image information (S510). According to a method of generating the CGH, the CGH may be divided into a point cloud type, a polygonal type, a depth map (or a layer-based) type, etc. However, the method of generating the CGH is well known, and thus, its detailed description is omitted.

The processor 130 may modulate the CGH by using the phase map including the information about the optical aberration of the freeform curved surface 121 and may apply the modulated CGH to the image generator 110 (S520). The phase map may include the information about the optical aberration of the freeform curved surface, and thus, the processor 130 may generate the modulated CGH by applying a conjugate value of the phase map to the CGH.

The image generator 110 may generate the hologram image by modulating the light using the modulated CGH (S530). The hologram image may be reflected from the freeform curved surface 121 and may be incident to an eye of a viewer. The hologram image may be generated based on the CGH modulated using the conjugate value of the phase map, and thus, when light corresponding to the hologram image is reflected by the freeform curved surface 121, the light may be converted to light in which the optical aberration due to the freeform curved surface 121 is compensated for and may be incident to the eye of the viewer.

Figure 7:
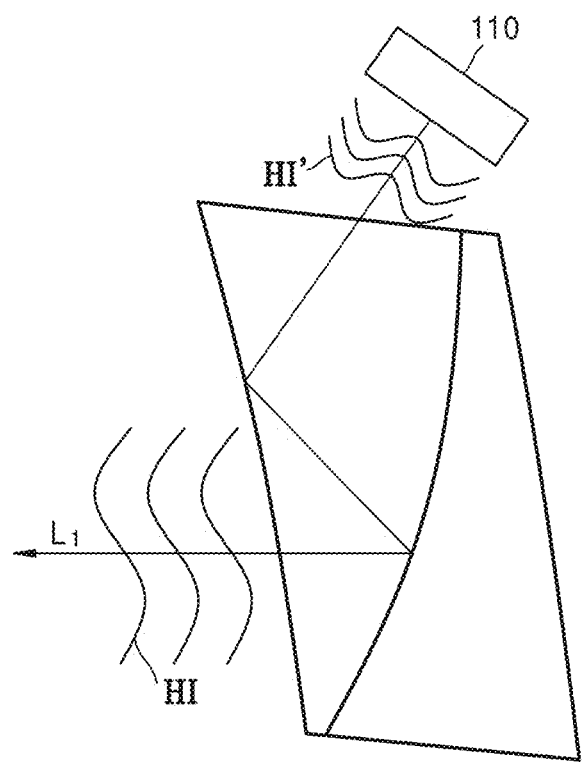
FIG. 7 is a reference diagram for describing, based on a wavefront, compensation of an optical aberration due to a freeform curved surface, according to an embodiment.

FIG. 7 is a reference diagram for describing, based on a wavefront, compensation of an optical aberration due to the freeform curved surface 121, according to an embodiment. As illustrated in FIG. 7, the image generator 110 may generate the hologram image by using the CGH modulated using the phase map including the information about the optical aberration of the freeform curved surface 121, and thus, a hologram image HI' generated by the image generator 110 may include not only color information and depth information, but also optical aberration information. The hologram image HI' may be reflected by the freeform curved surface 121, and thus, the optical aberration information may be offset, and a hologram image HI including color information and depth information may be incident to the eye of the viewer.

The freeform curved surface 121 may be designed for an optical system 120 that is off-axial, and thus, shape distortion of an image occurring due to the freeform curved surface 121 may become much more irregular and significant than pincushion distortion occurring when a general convex lens is used to view a virtual image. For example, even when one pixel is generated by compensating for a phase by backwardly propagating a central field of the virtual image, a location to which corresponding rays are converged may not be the center of the spatial light modulator 220. This error may be increased toward an outer portion of an image, that is, this error may be increased as an incident angle of a field is increased.

Figure 8A:
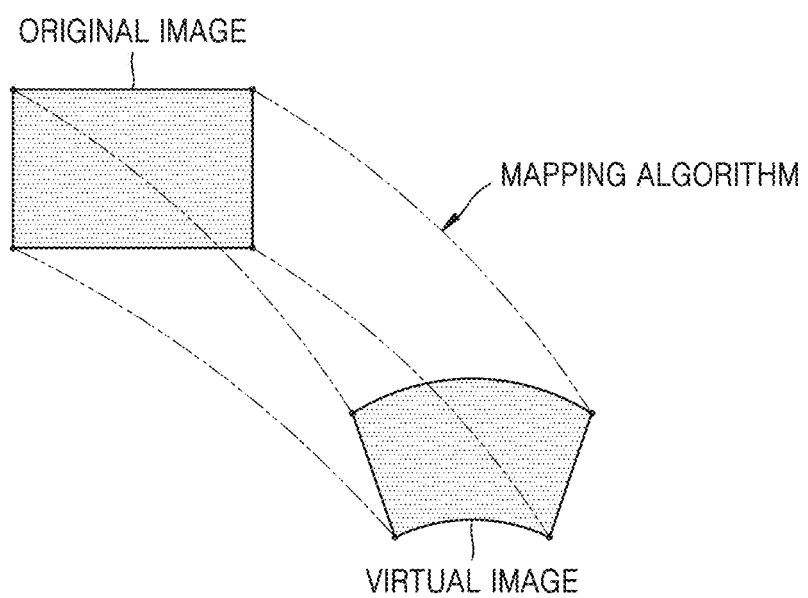
FIGS. 8A through 8C are reference diagrams for describing an algorithm for compensating for shape distortion of an image, according to an embodiment.
Figure 8B:
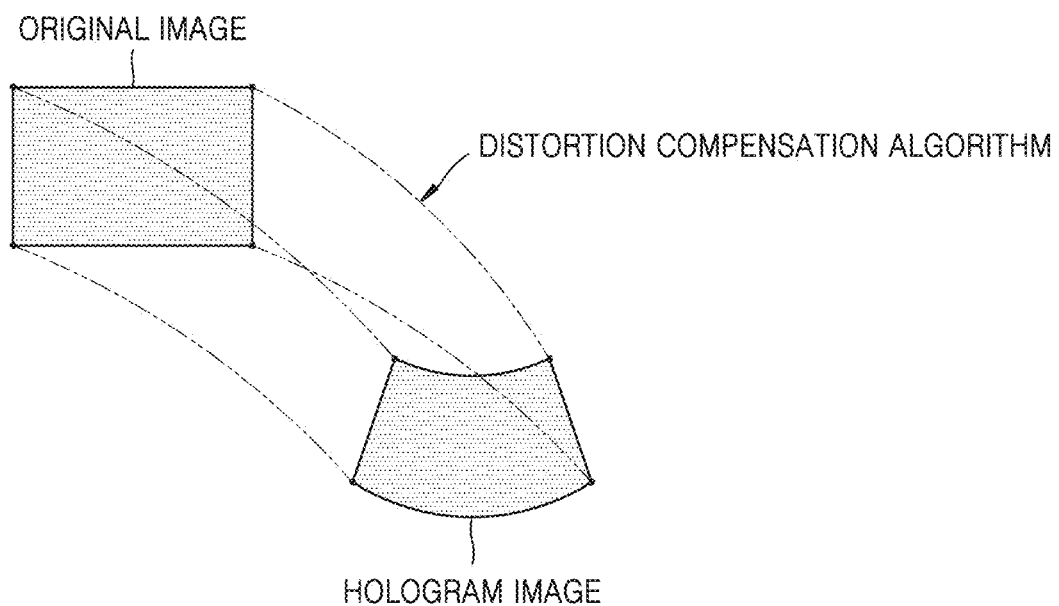
Figure 8C:
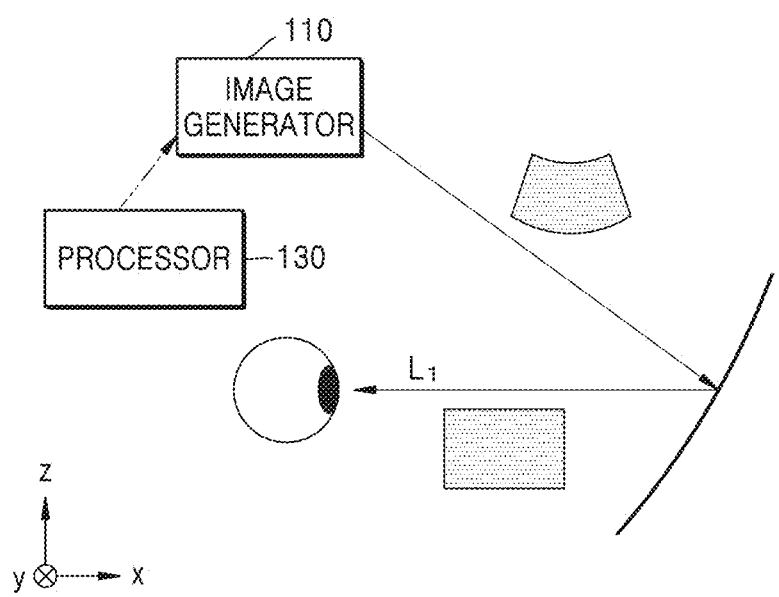

FIGS. 8A through 8C are reference diagrams for describing an algorithm for compensating for shape distortion of an image, according to an embodiment. As illustrated in FIG. 8A, the processor 130 may obtain a mapping algorithm configured to map pixel location information of an original image (or may be referred to as "image information") and pixel location information of a virtual image in a one-on-one correspondence manner. To obtain the mapping algorithm, an image sensor may be arranged at a location of a display apparatus, at which an eye of a viewer is to be positioned, to obtain the virtual image. Also, the processor 130 may obtain a distortion compensation algorithm by inversely transforming the mapping algorithm.

Also, as illustrated in FIG. 8B, the processor 130 may apply the distortion compensation algorithm to the original image based on the pixel information included in the image information and may generate a CGH based on the original image (e.g., the image information) to which the distortion compensation algorithm is applied, and the spatial light modulator 220 may generate the hologram image based on the CGH. The hologram image may be an image based on the distortion compensation algorithm.

As illustrated in FIG. 8C, in the hologram image, shape distortion of an image due to the reflection through the freeform curved surface 121 may be compensated for, and a virtual image in which the shape distortion is compensated for may be incident to the eye of the viewer.

The mapping algorithm may be obtained based on a relationship of pixel units between the virtual image and the original image (e.g., the image information). In other words, the mapping algorithm may be obtained to map each pixel of the original image to a respective pixel of the virtual image. However, the disclosure is not limited thereto. The mapping algorithm may be obtained based on a relationship between one or more pixels of the virtual image and one or more corresponding pixels of the original image, and the distortion compensation algorithm may be based on location information of the one or more pixels. Also, the processor 130 may obtain compensated image information by applying the distortion compensation algorithm to one or more pixels of the original image (or the image information) and then applying linear interpolation to the rest of the pixels of the original image.

Figure 9A:
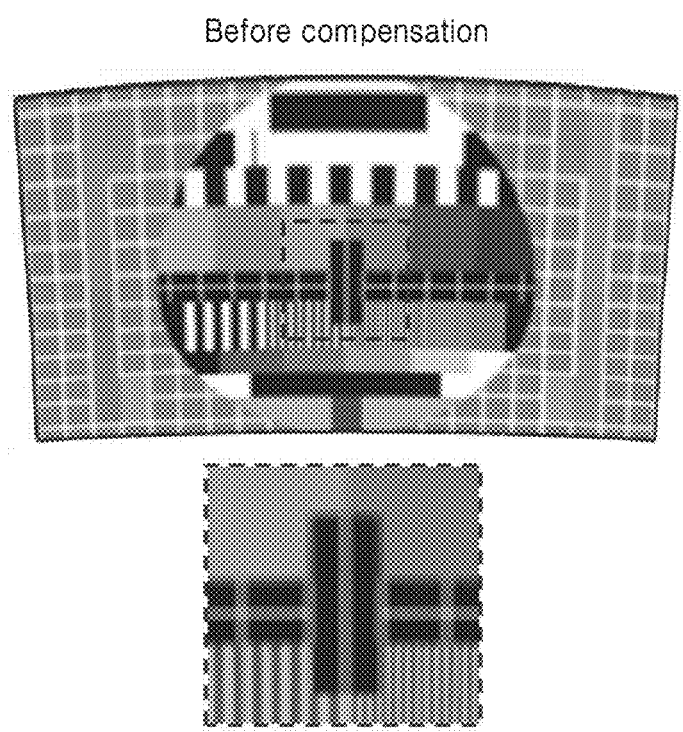
FIG. 9A illustrates a result of simulating a virtual image by using a freeform curved surface.
Figure 9B:
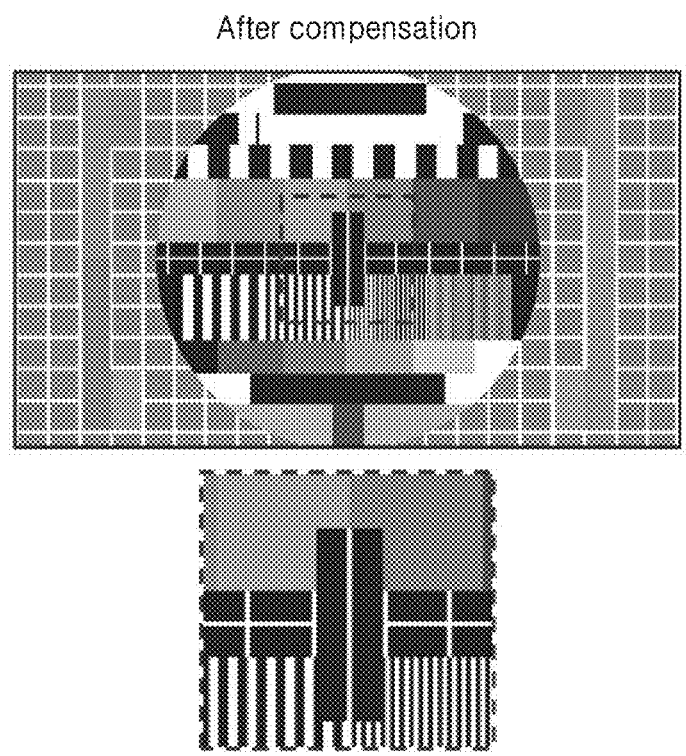
FIG. 9B illustrates a result of simulating a virtual image by using a phase map and a distortion compensation algorithm, according to an embodiment.

FIG. 9A illustrates a result of simulating a virtual image by using the freeform curved surface 121, and FIG. 9B illustrates a result of simulating a virtual image by using a phase map and a distortion compensation algorithm, according to an embodiment. As illustrated in FIG. 9A, it is identified that before compensation, an image is distorted, and a virtual image that is not vivid due to an optical aberration is provided. However, after applying the phase map and the distortion compensation algorithm, it is identified as illustrated in FIG. 9B that not only the image is not distorted, but also the vivid image is provided.

Figure 10:
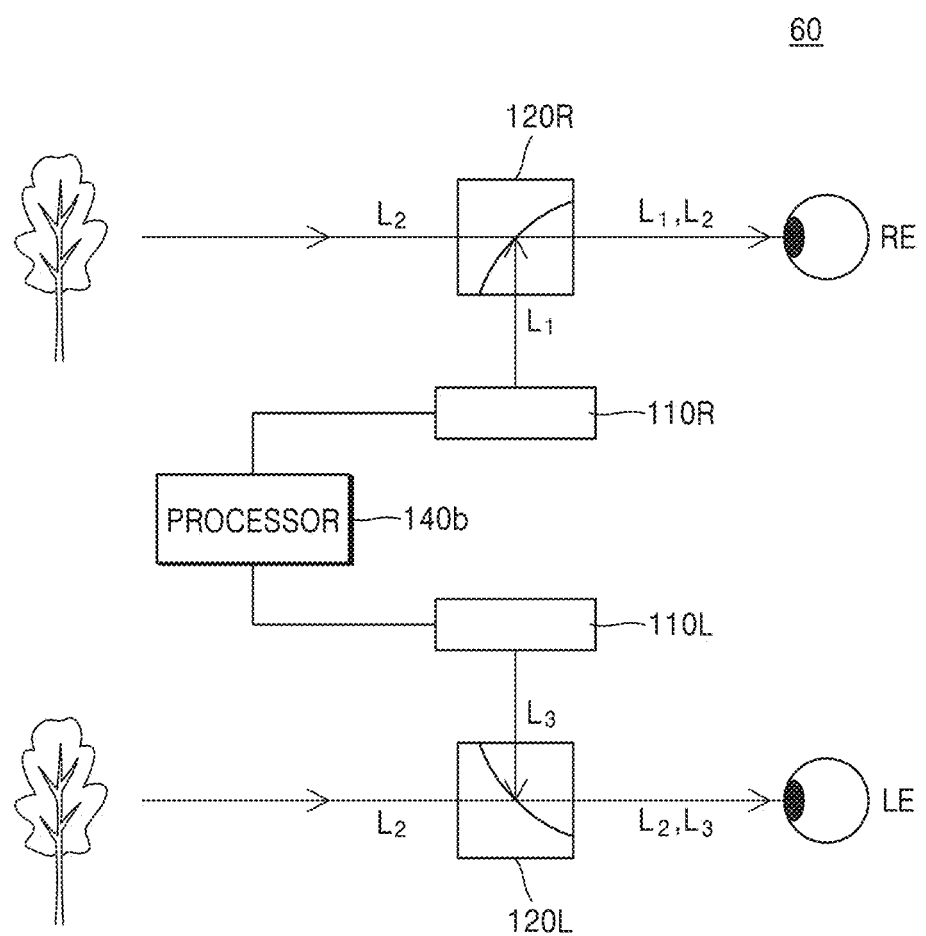
FIG. 10 illustrates a display apparatus configured to provide an image to each of both eyes, according to an embodiment.

FIG. 10 illustrates a display apparatus 60 configured to provide an image to each of both eyes, according to an embodiment. The image provided to each of the eyes may be the same or may be an image having time difference information.

The display apparatus 60 may include a first image generator 110R configured to generate an image for a right eye, a first image convergence member 120R configured to converge the image for the right eye and an image of a real environment to one area, a second image generator 110L configured to generate an image for a left eye, a second image convergence member 120L configured to converge the image for the left eye and an image of the real environment to one area, and a processor 140b configured to control the first and second image generators 110R and 110L to display the image in a representative depth.

The first and second image generators 110R and 110L may generate the image for the right eye and the image for the left eye, respectively, under control of the processor 140b. The first and second image generators 110R and 110L are the same as described above, and thus, their detailed descriptions are omitted.

The processor 140b may not only generate a light modulation signal so that the first and second image generators 110R and 110L may generate the images, but may also determine the representative depth from image information or information received from an eye tracking sensor.

The first image convergence member 120R may converge the image for the right eye and the image of the real environment to an area by changing at least one of a light path $L_1$ of the image for the right eye and a light path $L_2$ of the image of the real environment. Here, the area may be a right eye RE of a viewer. The first image convergence member 120R may transmit a plurality of rays according to the plurality of light paths $L_1$ and $L_2$ to the eye of the viewer. The second image convergence member 120L may converge the image for the left eye and the image of the real environment to an area by changing at least one of a light path $L_3$ of the image for the left eye and the light path $L_2$ of the image of the real environment. Here, the area may be a left eye LE of the viewer.

The first and second image convergence members 120R and 120L may each include the freeform curved surface 121 described above. In addition, the first and second image convergence members 120R and 120L may further include a waveguide, a light transmissive plate, a beam splitter, a transflective film, etc.

The image transmitted by the light of the first light path $L_1$ and the third light path $L_3$ may be an image provided in an AR device. The image of the real environment transmitted by the light of the second light path $L_2$ may be an environment faced by the viewer through the AR device. The real environment may include a front view faced by the viewer and may include a predetermined background subject.

Figure 11:
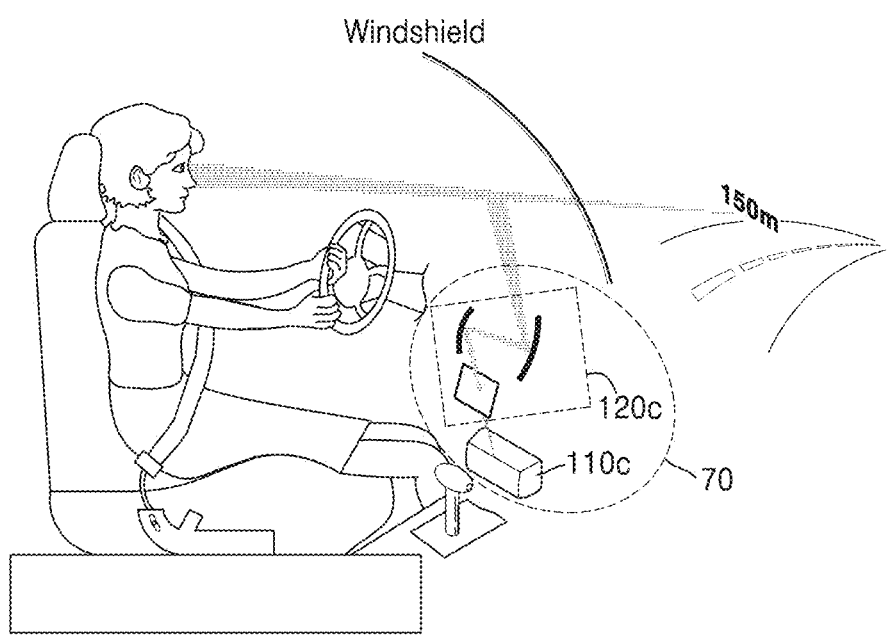
FIG. 11 illustrates an example in which a display apparatus according to an embodiment is applied to a vehicle.

FIG. 11 illustrates an example in which a display apparatus according to an example embodiment is applied to a vehicle. The display apparatus may be applied to a vehicle head up display apparatus 70. The vehicle head up display apparatus 70 may include an image generator 110c provided in a region of the vehicle and at least one optical system 120c configured to convert a light path for a driver to watch an image generated by the image generator 110c. The optical system 120c may include a freeform optical system according to an embodiment.

Figure 12:
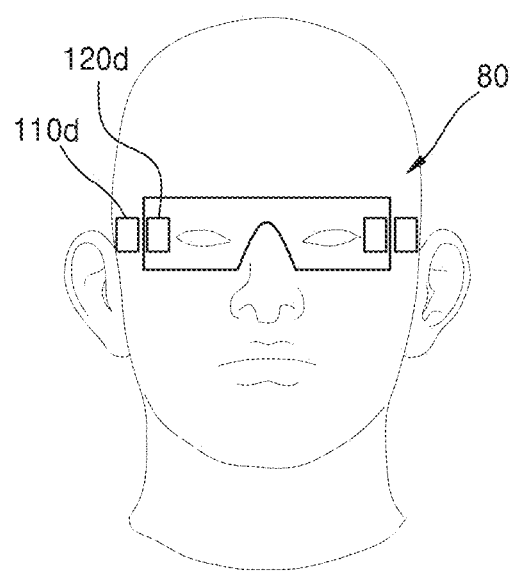
FIG. 12 illustrates an example in which a display apparatus according to an embodiment is applied to AR glasses or VR glasses.

FIG. 12 illustrates an example in which a display apparatus according to an example embodiment is applied to AR glasses or VR glasses. The AR glasses 80 may include an image generator 110d configured to generate an image and an optical system 120d configured to guide the image to enter into an eye of a viewer from the image generator 110d. The optical system 120d may include a freeform optical system according to an embodiment.

In addition, the holographic display apparatuses 10 and 20 according to an embodiment may be realized as various types of wearable devices, head mounted displays (HMDs), glasses-type displays, or goggle-type displays.

The holographic display apparatuses 10 and 20 described above may be synchronized or connected to other electronic devices, such as smart phones, etc., to operate. For example, a processor configured to drive an image generator may be included in the smartphone. In addition, the holographic display apparatuses 10 and 20 described above may be included in a smartphone.

According to the holographic display apparatus 10 and 20 and the operating methods thereof, an optical aberration due to a freeform curved surface may be compensated for.

According to the holographic display apparatus 10 and 20 and the operating methods thereof, shape distortion of an image due to the freeform curved surface may be compensated for.

The holographic display apparatuses 10 and 20 described above may be easily applied to a wearable device. For example, the holographic display apparatuses 10 and 20 may be applied to a glasses-type AR display device, etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
    an image generator configured to generate a hologram image by modulating light;
    an optical system comprising a freeform curved surface configured to form the hologram image generated by the image generator at a predetermined depth; and
    a processor configured to:
        generate a computer-generated hologram (CGH) based on three-dimensional image information using a phase map, the phase map comprising information about an optical aberration due to the freeform curved surface; and
        control the image generator to modulate the light based on the CGH.

2. The holographic display apparatus of claim 1,
    wherein the phase map comprises phase information of the light based on a light path on which the light modulated by the image generator is transmitted to a viewer by the freeform curved surface.

3. The holographic display apparatus of claim 2,
    wherein the phase information of the light comprises a difference between a phase of the light at a time when the light is modulated by the image generator and a phase of the light at a time when the light reaches the viewer.

4. The holographic display apparatus of claim 2,
    wherein the phase information is inversely proportional to a wavelength of the light modulated by the image generator.

5. The holographic display apparatus of claim 2,
    wherein the phase information is proportional to a refractive index of a medium on the light path on which the light modulated by the image generator is transmitted to the viewer through the freeform curved surface.

6. The holographic display apparatus of claim 2,
    wherein the phase information is proportional to a length of the light path on which the light modulated by the image generator is transmitted to the viewer through the freeform curved surface.

7. The holographic display apparatus of claim 1,
    wherein the processor is further configured to perform phase modulation on the CGH using the phase map.

8. The holographic display apparatus of claim 7,
    wherein the processor is further configured to modulate the CGH using a conjugate value of the phase map.

9. The holographic display apparatus of claim 1,
    wherein the processor is further configured to apply, to the three-dimensional image information, a distortion compensation algorithm configured to compensate for image shape distortion due to the freeform curved surface.

10. The holographic display apparatus of claim 9,
    wherein the distortion compensation algorithm comprises an inversely transformed algorithm of a mapping algorithm, the mapping algorithm being configured to map location information of pixels included in the three-dimensional image information with location information of pixels of a virtual image corresponding to the three-dimensional image information.

11. The holographic display apparatus of claim 10,
    wherein the processor is further configured to apply the distortion compensation algorithm to an entirety of the location information of the pixels included in the three-dimensional image information.

12. The holographic display apparatus of claim 10,
    wherein the processor is further configured to apply the distortion compensation algorithm to the location information of one or more pixels from among the pixels included in the three-dimensional image information and linearly interpolate the location information of the other pixels from among the pixels included in the three-dimensional image information.

13. The holographic display apparatus of claim 10,
    wherein the optical system comprises a combiner configured to converge the hologram image and external light to one point, the external light corresponding to an external environment, and
    wherein the freeform curved surface is integral with the combiner.

14. The holographic display apparatus of claim 13,
    wherein the combiner comprises a waveguide configured to transmit the hologram image, wherein the freeform curved surface is arranged on a surface of the waveguide.

15. The holographic display apparatus of claim 13,
    wherein the combiner further comprises a transflective layer arranged on the freeform curved surface.

16. The holographic display apparatus of claim 1,
wherein the holographic display apparatus comprises a virtual reality apparatus or an augmented reality apparatus.

17. An operating method of a holographic display apparatus comprising a freeform curved surface, the operating method comprising:
generating a computer-generated hologram (CGH) based on three-dimensional image information using a phase map, the phase map comprising information about an optical aberration due to the freeform curved surface;
generating a hologram image by modulating light based on the CGH; and
forming the hologram image at a predetermined depth by the freeform curved surface.

18. The operating method of claim 17,
wherein the phase map comprises phase information of the light based on a light path on which the light modulated as the hologram image is transmitted to a viewer by the freeform curved surface.

19. The operating method of claim 18,
wherein the phase information of the light comprises a difference between a phase of the light at a time when the light is modulated as the hologram image and a phase of the light at a time when the light reaches the viewer.

20. The operating method of claim 18,
wherein the generating of the CGH comprises modulating the CGH using a conjugate value of the phase map.

* * * * *